US012149500B2

(12) United States Patent
Clay

(10) Patent No.: US 12,149,500 B2
(45) Date of Patent: Nov. 19, 2024

(54) ALIAS CONFIGURATION MANAGEMENT

(71) Applicant: Yokogawa Electric Corporation, Tokyo (JP)

(72) Inventor: Patrick Clay, Frisco, TX (US)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/092,077

(22) Filed: Dec. 30, 2022

(65) Prior Publication Data
US 2024/0223530 A1  Jul. 4, 2024

(51) Int. Cl.
*H04L 61/4541* (2022.01)
*H04L 67/1095* (2022.01)

(52) U.S. Cl.
CPC ...... *H04L 61/4541* (2022.05); *H04L 67/1095* (2013.01)

(58) Field of Classification Search
None
See application file for complete search history.

(56) References Cited

U.S. PATENT DOCUMENTS

| 10,764,319 | B2 | 9/2020 | Dhakshinamoorthy et al. |
| 2017/0171231 | A1* | 6/2017 | Reybok, Jr. ......... H04L 63/1433 |
| 2018/0089328 | A1* | 3/2018 | Bath .................. G06F 16/9538 |
| 2019/0272271 | A1* | 9/2019 | Bhattacharjee ..... G06F 16/2471 |
| 2020/0050607 | A1* | 2/2020 | Pal .................... G06F 16/24549 |
| 2020/0409340 | A1 | 12/2020 | Hampikian |
| 2021/0117425 | A1* | 4/2021 | Rao ....................... H04L 9/0866 |

FOREIGN PATENT DOCUMENTS

CN  111600739  8/2020

OTHER PUBLICATIONS

Galli et al., "The LHCb Farm Monitoring and Control System", Apr. 1, 2007, IEEE, 2007 15th IEEE-NPSS Real-Time Conference ( pp. 1-8) (Year: 2007).*
"OPC Unified Architecture" OPC Foundation. 29 pages, dated Oct. 15, 2021.

* cited by examiner

*Primary Examiner* — Davoud A Zand
(74) *Attorney, Agent, or Firm* — Gray Ice Higdon

(57) ABSTRACT

Implementations are described herein for reconciling alias configuration files. In various implementations, networking information may be retrieved from an alias server. The networking information may correspond to registered aliases of a plurality of data sources made accessible by a plurality of distributed control nodes (DCNs) of a process automation facility. The plurality of DCNs may be interrogated based on the networking information corresponding to the registered aliases. Based on responses to the interrogating, an updated alias configuration file may be generated and compared with a previously utilized alias configuration file.

18 Claims, 4 Drawing Sheets

ALIAS CONFIGURATION MANAGEMENT

BACKGROUND

Process automation facilities may include myriad sensors, actuators, and distributed control nodes (DCNs), among other components. Tracking these nodes and/or their constituent components using traditional node identifiers (referred to herein as "node IDs") may present various challenges. Connection strings of individual nodes, which may include Internet Protocol (IP) addresses and/or Transmission Control Protocol (TCP) ports, as well as node IDs used to identify individual components that are accessible via those nodes, are not readily interpretable by or meaningful to humans, and do not easily scale. Accordingly, Open Platform Communications Unified Architecture (OPC UA) includes a Global Discovery Server (GDS) that provides an "Alias Name Service" (ANS) that facilitates the mapping of aliases (strings of characters that are human-readable/meaningful) to connection strings and node IDs. In other words, the GDS can act like a "phone book" for OPC UA clients.

SUMMARY

Aliases are often defined in batches, e.g., by way of an alias configuration file that includes a list of aliases and corresponding connection strings/node IDs. The alias configuration file can be provided to a configuration tool, which creates aliases and causes the corresponding DCNs to register those aliases with the GDS. Over time, changes may occur to the process automation facility, and those changes may cause the system integrator's original alias configuration file to become stale. For example, additional aliases may be registered separately, hardware may fail and/or may be replaced, and so forth.

Implementations of the present disclosure enable reconciliation of the system integrator-created alias configuration files and subsequent/separate changes made to aliases via the ANS, e.g., by querying registered aliases from the GDS and performing various techniques to verify or test those registrations. Discrepancies in aliases between the original alias configuration file and the updated alias configuration file may be used, for instance, to inform appropriate personnel as to what changes have been made, to identify unresponsive and/or malfunctioning nodes, etc. For example, the newly retrieved registered aliases may be used to interrogate individual DCNs that registered those aliases previously. Among other things, this may enable quick identification of DCNs that are unresponsive/malfunctioning.

In some implementations, a method may be implemented using one or more processors and may include: retrieving, from an alias server, networking information corresponding to registered aliases of a plurality of data sources made accessible by a plurality of distributed control nodes (DCNs) of a process automation facility; interrogating the plurality of DCNs based on the networking information corresponding to the registered aliases; based on responses to the interrogating, generating an updated alias configuration file; and comparing the updated alias configuration file with a previously utilized alias configuration file.

In various implementations, the networking information may include connection strings and node identifiers (IDs) that correspond to the registered aliases. In various implementations, each of the DCNs hosts a server that provides access to a respective one or more of the plurality of data sources. In various implementations, the alias server may be a global discovery server (GDS).

In various implementations, the method may further include verifying, based on the comparing, whether the plurality of data sources made accessible by the plurality of DCNs correspond to a conceptual plurality of data sources contained in the previously utilized alias configuration file. In various implementations, the method may further include: identifying one or more discrepancies between the plurality of data sources made accessible by the plurality of DCNs and the conceptual plurality of data sources contained in the previously utilized alias configuration file; and causing output to be rendered that conveys one or more of the identified discrepancies.

In various implementations, the method may further include merging the updated alias configuration file with the previously utilized alias configuration file based on the comparing. In various implementations, the method may further include updating the previously utilized alias configuration file based on the comparing. In various implementations, at least some of the plurality of data sources may include input/output (I/O) channels for sensors and/or actuators of the process automation facility.

In various implementations, the method may include, prior to the retrieving, registering the conceptual plurality of data sources contained in the previously utilized alias configuration file with the alias server, wherein the comparing verifies the registering. In various implementations, the retrieving may include retrieving a list of the registered aliases from the alias server. In various implementations, the interrogating may include obtaining locally registered aliases from the plurality of DCNs, and the method further comprises comparing the list of the registered aliases retrieved from the alias server to the locally registered aliases.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

In another aspect, a system may include one or more processors and memory storing instructions that, in response to execution by the one or more processors, cause the one or more processors to: obtain networking information corresponding to registered aliases of a plurality of data sources made accessible by a plurality of servers hosted across a distributed computing system of a process automation facility; using the networking information corresponding to the list of registered aliases, cause the plurality of servers to be interrogated; based on responses to the interrogation, generate an updated alias configuration file; and reconcile the updated alias configuration file with a previously utilized alias configuration file.

In various implementations, the networking information may include connection strings and node IDs that correspond to the registered aliases. In various implementations, each of the servers may be hosted by a respective DCN that provides access to a respective one or more of the plurality of data sources. In various implementations, at least some of the plurality of data sources may include I/O channels for sensors and/or actuators of the process automation facility.

In various implementations, the system may further include instructions to: verify whether the plurality of data sources made accessible by the plurality of servers correspond to a conceptual plurality of data sources contained in the previously utilized alias configuration file; and identify one or more discrepancies between the plurality of data sources made accessible by the plurality of servers and the conceptual plurality of data sources contained in the previously utilized alias configuration file.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Implementations described herein pertain to reconciliation of alias configuration files with registered aliases, e.g., by creating updated alias configuration files and comparing those to the previous-created alias configuration files. Discrepancies between the original alias configuration file and the updated alias configuration file may be used, for instance, to inform appropriate personnel as to what changes have been made, to identify unresponsive and/or malfunctioning nodes, etc. For example, the newly retrieved registered aliases may be used to interrogate individual DCNs that registered those aliases previously. Among other things, this may enable quick identification of DCNs that are unresponsive/malfunctioning.

Figure 1:
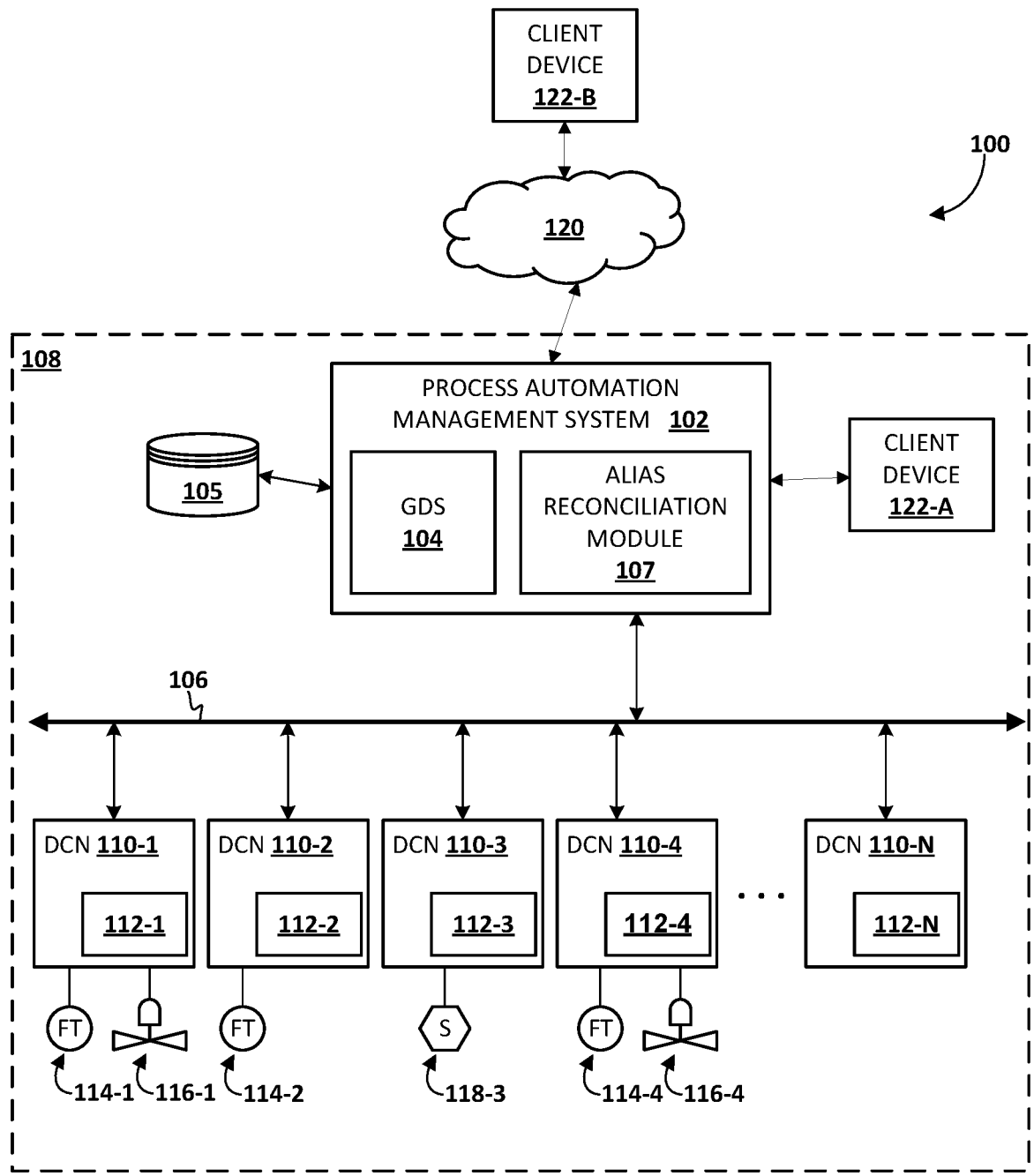
FIG. 1 schematically depicts an environment in which selected aspects of the present disclosure may be implemented, in accordance with various embodiments.

Referring now to FIG. 1, an example environment 100 in which various aspects of the present disclosure may be implemented is depicted schematically. A process automation management system 102 is operably coupled with a process automation network 106 in a process automation facility 108. Process automation facility 108 may take numerous forms and may be designed to implement any number of at least partially automated processes. For example, process automation facility 108 may take the form of a chemical processing plant, an oil or natural gas refinery, a catalyst factory, a manufacturing facility, an offshore oil platform, etc.

Process automation network 106 may be implemented using various wired and/or wireless communication technologies, including but not limited to the Institute of Electrical and Electronics Engineers (IEEE) 802.3 standard (Ethernet), IEEE 802.11 (Wi-Fi), cellular networks such as 3GPP Long Term Evolution ("LTE") or other wireless protocols that are designated as 3G, 4G, 5G, and beyond, and/or other types of communication networks of various types of topologies (e.g., mesh). Process automation is often employed in scenarios in which the cost of failure tends to be large, both in human safety and financial cost to stakeholders. Accordingly, in various implementations, process automation network 106 may be configured with redundancies and/or backups to provide high availability (HA) and/or high quality of service (QOS).

Process automation management system 102 may include a global discovery server (GDS) 104, an alias reconciliation module 107, and a database 105 that stores information used by GDS 104 and/or alias reconciliation module 107 to practice selected aspects of the present disclosure. Various aspects of process automation management system 102, such as GDS 104 and/or alias reconciliation module 107, may be implemented using any combination of hardware and software. In some implementations, process automation management system 102 may be implemented across multiple computer systems as part of what is often referred to as a "cloud infrastructure" or simply the "cloud." However, this is not required, and in FIG. 1, for instance, process automation management system 102 is implemented within process automation facility 108, e.g., in a single building or across a single campus of buildings or other industrial infrastructure. In such an implementation, process automation management system 102 may be implemented on one or more local computing systems, such as on one or more server computers.

In addition to process automation management system 102, a variety of other nodes are operably coupled with process automation network 106. In FIG. 1, for instance, N (positive integer) DCNs 110-1 to 110-N are operably coupled with process automation network 106. Each DCN may include circuitry or logic 112 that may take various forms, such as processor(s) that execute instructions in memory, a field-programmable gate array (FPGA), an application-specific integrated circuit (ASIC), and so forth. Each DCN 110 may have a particular role to play in process automation network 106. "Compute" DCNs may, for instance, control a process loop (e.g., a chemical process loop) in which various "field" devices (e.g., devices having sensors and/or actuators) interface with each other to perform some number of function control blocks (FBs).

Each DCN 110 may have various input/output (I/O) components, which are accessible as "channels," and which dictate at least some of its operational technology (OT) capabilities and, more generally, its role at process automation facility 108. For example, first DCN 110-1 includes a flow transmitter (FT) component 114-1 and an actuator (e.g., a valve) 116-1. In some implementations, a software component implemented on DCN 110-1 (or any other DCN mentioned herein) may transform an analog signal to digital; and/or convert the signal between different units of measurement, for instance. In addition, in some implementations, a software component implemented on DCN 110-1 may be configured to translate data between various protocols. For example, a particular vendor's DCN (or other legacy device) may not be configured natively to communicate data using the OPC Unified Architecture (OPC UA). In some such implementations, another DCN 110 may be deployed to translate this data from the vendor's proprietary format to OPC UA. Some such DCNs 110 may be referred to as "gateways" or "bridges" because they form a link between legacy technology and standards such as OPC UA.

Actuator 116-1 (and other actuators described herein) may be any electric, hydraulic, mechanical, and/or pneumatic component that is controllable to affect some aspect of a process automation workflow that occurs at process automation facility 108. In many cases, an actuator 116 may perform its function in response to various signals, such as sensor signals or commands from compute DCNs (which themselves may monitor for sensor signals). Some non-limiting examples of actuators 116 include, but are not limited to, valves, pistons, rotors, switches, heaters, coolers, stirrers, injectors, devices to create vacuums, belts, tracks, gears, grippers, motors, relays, servomechanisms, etc.

Each DCN 110 may have different OT capabilities with respect to one or more (e.g., all) other DCNs 110. In FIG. 1, for instance, second DCN 110-2 includes a FT component 114-2 but no actuator. Third DCN 110-3 includes a sensor 118-3 but no actuator. Sensor 118-3 (and elsewhere herein) may take various forms, including but not limited to a pressure sensor, a temperature sensor, a flow sensor (e.g., FT component 114), various types of proximity sensors, a light sensor (e.g., a photodiode), a pressure wave sensor (e.g., microphone), a humidity sensor (e.g., a humistor), a radiation dosimeter, a laser absorption spectrograph (e.g., a multi-pass optical cell), and so forth. Like first DCN 110-1, fourth DCN 110-4 also includes both a FT component 114-4 and an actuator 116-4.

Unlike DCNs 110-1 to 110-4, DCN 110-N does not include any input/output (actuators or sensors) components. Instead, DCN 110-N may be a "compute only" DCN whose role is to facilitate cooperation between itself and one or more other DCNs 110 on process automation network 106 to implement an at least partially automated process. For example, DCN 110-N may control a single process loop (e.g., a chemical process control loop) that involves one or more other DCNs 110. In some cases, a compute DCN 110 may perform a role similar to an autopilot on an airplane—the compute DCN 110 may receive various signals and, based on those signals and various criteria and/or thresholds, control various actuators. For example, the compute DCN 110 may monitor various sensors 118 to ascertain data about chemical levels, flow rates (e.g., across valves), tank temperatures, control rates, etc., and may control one or more actuators 116 based on these data and/or comparisons of these data to various criteria and/or thresholds. For instance, compute DCN 110-N can control actuator 116-4 by transmitting, to DCN 116-4, corresponding command(s) that can optionally conform to a protocol that is specific to DCN 116-4.

Many DCNs may have multiple physical I/O components, and hence, multiple I/O channels that can be accessed, e.g., by other devices or systems such as other DCNs, GDS 104, alias reconciliation module 107, etc. For example, each DCN 110 may host a server, such as an OPC UA server, that provides access to various data sources of the DCN 110, including the DCN's I/O channels. A client application, such as an OPC UA client operating on a DCN 110, may connect to a server hosted by the DCN so that it can read data from input channels associated with, for instance, sensors such as FT components 114, sensors 118, etc. Likewise, the client application may connect to the server hosted by the DCN to write data to output channels, e.g., to provide control signals or commands to actuators 116.

As noted above, tracking the myriad data sources (e.g., I/O channels and/or other data sources) of DCNs deployed across a complex process automation facility 108 using traditional node identifiers (referred to herein as "node IDs") may present various challenges. Connection strings of individual nodes, which may include Internet Protocol (IP) addresses and/or Transmission Control Protocol (TCP) ports, as well as node IDs used to identify individual components that are accessible via those nodes, are not readily interpretable by or meaningful to humans, and do not easily scale. Hence, GDS 104 is used to assign human-interpretable and/or meaningful aliases to the various data sources made available by the DCNs.

As an example, a OPC UA server executing on a DCN 110 may be reachable, e.g., by an OPC UA client, using the following connection string:

opc.tcp://10.0.1.1:48010

The characters "opc.tcp" may specify a connection protocol to be used. The numbers "10.0.1.1" may be an IP address of the DCN executing the OPC UA server. The numbers "48010" may be the TCP port to which the OPC UA server is listening and accepting connections. This OPC UA server may in turn provide access to multiple data sources, such as I/O channels or other pieces of data (e.g., sensor readings stored in memory, results of calculations, semaphore values, etc.). Each of these individual data sources may be referenced using a Node ID, such as:

$$ns = 5; i = 5242$$

An OPC UA client, and by an extension, a person controlling it, may need to know both these unintuitive and/or cryptic values in order to access the particular data source.

Accordingly, OPC UA servers executing on DCNs can register aliases to GDS 104 using an Alias Name Server (ANS). This allows an alias to be created that maps a human-interpretable alias (e.g., "MyAlias1") to both the connection string and Node ID set forth above. In other words, an alias identifies, for OPC UA clients, which OPC UA server, and where on that OPC UA server, a particular data source can be accessed. Later, an OPC UA client seeking to access the data source may query GDS 104 using an alias (e.g., "MyAlias1"). GDS 104 may respond by providing networking information including the corresponding connection string and Node ID. The OPC UA client can then use this networking information to make a connection to the corresponding OPC UA server, and read data from and/or write data (e.g., control signals or commands) to the data source.

As noted previously, aliases are often defined in batches, e.g., by way of a configuration file that includes a list of aliases and corresponding connection strings/node IDs. The configuration file can be provided to a configuration tool, which creates aliases and causes the corresponding DCNs to register those aliases with GDS 104. Over time, changes may occur to the process automation facility, and those changes may cause the system integrator's original configuration file to become stale. For example, additional aliases may be registered separately at individual DCNs, hardware may fail and/or may be replaced, and so forth. Accordingly, reconciliation module 107 may be configured with selected aspects of the present disclosure to compare previously utilized alias configuration files with aliases maintained by GDS 104, and to perform various responsive actions.

Also depicted in FIG. 1 are a local client device 122-A and a remote client device 122-B. These client devices may be operable by personnel such as system integrators to configure and/or interact with various aspects of process automation management system 102. For example, a user may operate a client device 122 to connect an OPA UA client executing on one DCN 110 to an OPC UA serve executing on another DCN 110. Local client device 122-A may be connected to process automation management system 102 via one or more local area networks, such as 106. Remote client device 122-B may connect to process automation management system 102 via one or more wide area networks (120), such as the Internet.

Figure 2:
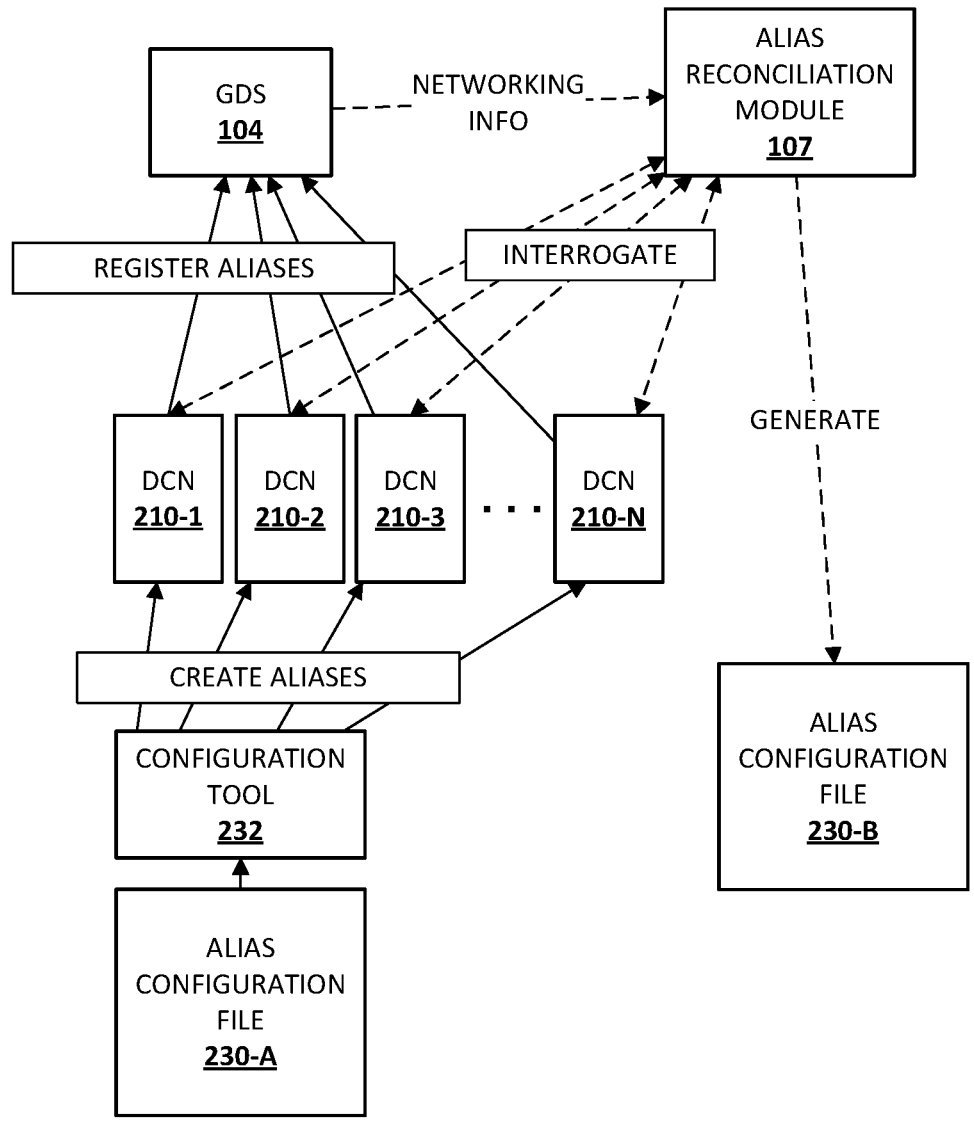
FIG. 2 schematically depicts on example of how techniques described herein may be implemented, in accordance with various embodiments.

FIG. 2 schematically depicts an example of how techniques described herein may be implemented, in accordance with various embodiments. Starting at bottom left, an alias configuration file 230-A may be created, e.g., by a system integrator operating a client device (e.g., 122-A or 122-B). Alias configuration file 230-A may include intended mappings between connections strings/Node IDs and aliases. Alias configuration file 230-A (as well as other alias configuration files described herein) may take various forms and/or formats, including but not limited to JavaScript Object Notation (JSON), extensible markup language (XML), spreadsheet data, etc. In some instances, alias configuration file 230-A may be used, e.g., by a configuration tool 232 (which may be implemented using any combination of hardware or software), as a batch alias registration file that causes configuration tool 232 to create aliases at a plurality of DCNs 210-1 to 210-N for which alias(es) are included in alias configuration file 230-A.

For example, configuration tool 232 may use an alias' connection string to connect to a OPA UA server executing on DCN 210-1. Then, one or more connection string/Node ID pairs associated with that alias may be transmitted to DCN 210-1. DCNs 210-1 to 210-N in turn may register their aliases with GDS 104. Subsequently, GDS 104 may be queried, e.g., by OPC UA clients executing on DCNs 210-1 to 210-N, to determine connection strings and Node IDs from aliases.

It is common for a system integrator or other personnel to rely on alias configuration file 230-A as an accurate mapping of aliases to corresponding connection strings and Node IDs. However, as noted previously, configuration file 230-A may become stale over time. Changes may be made to aliases, e.g., at GDS 104 directly (e.g., using client device 122) and/or via one or more DCNs 210. These changes may not be reflected in alias configuration file 230-A. Consequently, a system integrator may mistakenly perform various actions based on incorrect understanding of current aliases.

Accordingly, techniques described herein, which are represented by dashed arrows in FIG. 2, allow the system integrator to generate an "updated" alias configuration file 230-B. This process may be triggered automatically and/or manually, e.g., in response to command(s) received at configuration tool 232. This updated alias configuration file 230-B may then be used for various purposes, such as reconciliation, merging with the original alias configuration file 230-A, identifying malfunctioning or missing DCNs/OPC UA servers, etc.

As shown in FIG. 2, in various implementations, alias reconciliation module 107 may be configured to retrieve, e.g., from an alias server such as GDS 104, networking information corresponding to registered aliases of a plurality of data sources made accessible by a plurality of DCNs of a process automation facility. This networking information may include, for example, connection strings and Node IDs that correspond to the registered aliases. While alias reconciliation module 107 is depicted and described as performing many of the operations herein, this is not meant to be limiting. In various implementations, configuration tool 232 may be configured to perform selected aspects of the present disclosure. In some cases, configuration tool 232 may provide the ability to connect to other components, such as GDS 104 and/or alias reconciliation module 107.

Based on the networking information, alias reconciliation module 107 may interrogate the plurality of DCNs to determine which DCNs (or more particularly, which OPC UA servers) are active, as well as which data sources (e.g., I/O channels) remain available. For example, alias reconciliation module 107 may attempt to read data from each readable data source that is supposed to be provided by each OPC UA server. Readable data sources can include, for instance, input channels associated with sensors, output channels associated with actuators (e.g., to read current control signals being provided to the actuator), shared memory locations that store information of interest (running tallies, calculation results, semaphores, etc.), and so forth. In some cases, alias reconciliation module 107 may attempt to write to one or more data sources as well. For example, assuming it would pose no risk to a control loop or industrial process at large, alias reconciliation module 107 may attempt to send a control signal to an actuator, or may attempt to write to a shared memory location.

Based on the interrogating, e.g., based on responses to the interrogating, alias reconciliation module 107 may generate updated alias configuration file 230-B. Updated alias configuration file 230-B may include networking information for those DCNs 210 (e.g., and the OPC UA servers they execute) that responded to the interrogation. Any DCNs or servers that did not respond may not be included in updated alias configuration file 230-B. Additionally or alternatively, in some implementations, alias reconciliation module 107 may interrogate any available DCN, not just those identified by GDS 104. For example, alias reconciliation module 107 may use connection strings alone to connect to DCNs, and may interrogate those DCNs (or more particularly, those DCNs' OPC UA servers), for any available data sources, not just those represented by NodeIDs on the GDS 104. In either case, this may result in updated alias configuration file 230-B having one or more extra data sources, such as extra DCNs, I/O channels, etc.

Various actions may then be performed. For example, updated alias configuration file 230-B may be compared to original alias configuration file 230-A. One or more discrepancies (missing data sources, extra data sources) may be identified between the plurality of data sources made accessible by the plurality of DCNs 210 that are listed in updated alias reconciliation file 230-B and a conceptual plurality of data sources included in the previously utilized alias configuration file 230-A. The data sources in file 230-A are described as "conceptual" because they may have been created as intended data sources and may not necessarily have been verified as actually being accessible data sources. Based on the identified discrepanc(ies), alias reconciliation module 107 (or another component, e.g., a client application executing on client device 122) may cause output to be rendered that conveys one or more of the identified discrepancies. For example, the system integrator may be presented with a report or list that includes those DCNs, OPC UA servers, and/or individual data sources (e.g., I/O channels) that were not reachable during interrogation, or any extra data sources that were uncovered during interrogation.

In some implementations, the networking information obtained by alias reconciliation module 107 from GDS 104 may include a list of the registered aliases. In some such implementations, alias reconciliation module 107 may also obtain locally registered aliases from the plurality of DCNs 210-1 to 210-N, e.g., during interrogation. Alias reconciliation module 107 may then compare the list of the registered aliases retrieved from GDS 104 to the locally registered aliases. In this way, alias reconciliation module 107 can confirm whether GDS 104 is up-to-date with the current state of the DCNs 210-1 to 210-N.

Figure 3:
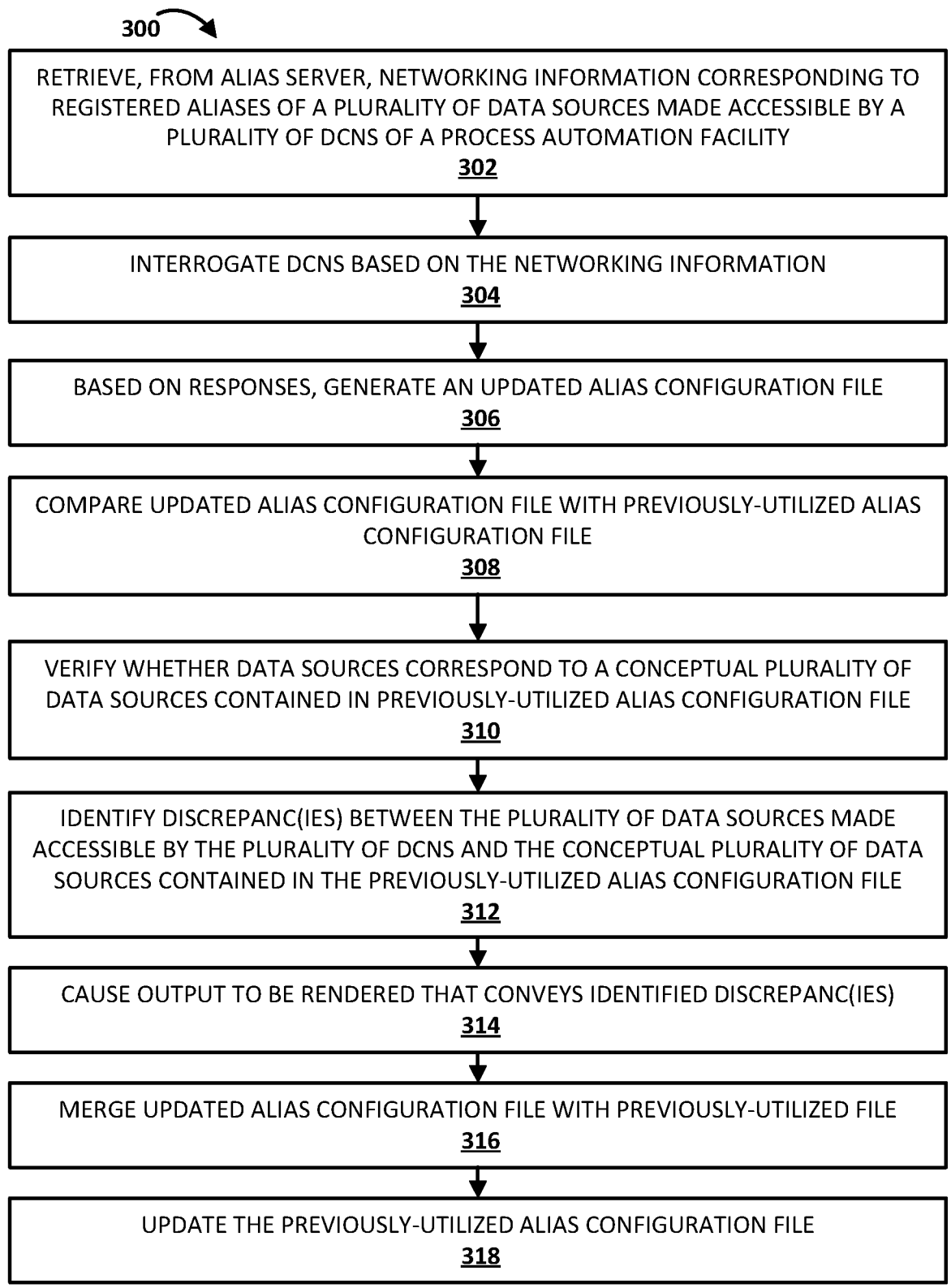
FIG. 3 illustrates an example method for performing selected aspects of the present disclosure.

FIG. 3 is a flowchart illustrating an example method 300 of practicing selected aspects of the present disclosure, in accordance with implementations disclosed herein. For convenience, the operations of the flow chart are described with reference to a system that performs the operations. This system may include various components of various computer systems, such as one or more components of process automation management system 102, including GDS 104. Moreover, while operations of method 300 are shown in a particular order, this is not meant to be limiting. One or more operations may be reordered, omitted or added.

At block 302, the system, e.g., by way of alias reconciliation module 107, may retrieve from an alias server such as GDS 104, networking information corresponding to registered aliases of a plurality of data sources made accessible by a plurality of DCNs of a process automation facility. This networking information may include, for instance, a list of aliases that were registered with GDS 104, e.g., by DCNs 210-1 to 210-N. Although not shown in FIG. 3, in some implementations, the original alias reconciliation file (230-A in FIG. 2) may have been used previously, e.g., to create aliases across multiple DCNs, and to trigger registration of those aliases with GDS 104. In such a case, some of the following operations of FIG. 3 may serve the purpose of verifying the integrity of that batch alias registration.

At block 304, the system, e.g., by way of alias reconciliation module 107, may interrogate the plurality of DCNs based on the networking information corresponding to the registered aliases. Based on responses to the interrogation of block 304, at block 306, the system, e.g., by way of alias reconciliation module 107, may generate an updated alias configuration file (e.g., 230-B in FIG. 2). At block 308, the system, e.g., by way of alias reconciliation module 107, may compare the updated alias configuration file with a previously utilized alias configuration file (e.g., 230-A in FIG. 2). Based on this comparison, alias reconciliation module 107 may perform a variety of different actions.

For example, at block 310, alias reconciliation module 107 may verify whether data sources in the updated alias configuration file (230-B) correspond a conceptual plurality of data sources that were listed in the original alias configuration file (230-A) (which are referred to herein as "conceptual" because those are the data sources that are expected/intended to be available, not necessarily what are actually available). In this way, the system may verify the previous deployment of aliases that was implemented when the original alias configuration file (230-A) was created and used to configure aliases on the individual DCNs.

Based on the verification of block 310, at block 312, the system, e.g., by way of alias reconciliation module 107, may identify one or more discrepancies between the plurality of data sources actually made accessible by the plurality of DCNs (e.g., those data sources that responded to interrogation) and the conceptual plurality of data sources contained in the previously utilized alias configuration file (230-A). At block 314, the system, e.g., by way of alias reconciliation module 107, may cause output to be rendered that conveys one or more of the discrepancies identified at block 312. For example, a client device 122 may render visual output that includes a list of those data sources that were identified in the previously utilized alias configuration file (230-A) but did not respond to interrogation, or those data sources that were not found in the previously utilize alias configuration file but were included in the updated alias configuration file (230-B).

As another example, at block 316, the system, e.g., by way of alias reconciliation module 107, may merge the updated alias configuration file with the previously utilized alias configuration file based on the comparing, e.g., by eliminating duplicate entries and creating new entries to include all unique data sources from both. As another example, at block 318, the system may update the previously utilized alias configuration file based on the comparing. That way, the system integrator can count on the original alias configuration file 230-A being accurate in real time.

Figure 4:
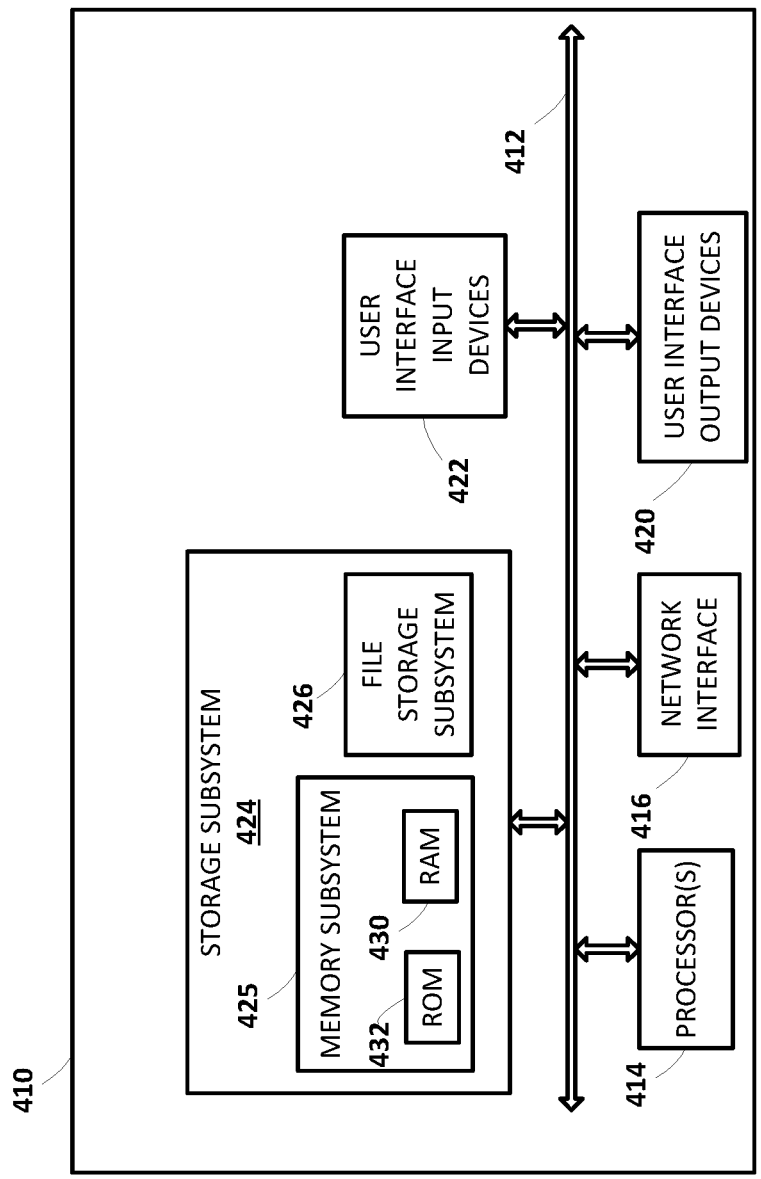
FIG. 4 schematically illustrates an example computer architecture on which selected aspects of the present disclosure may be implemented.

FIG. 4 is a block diagram of an example computing device 410 that may optionally be utilized to perform one or more aspects of techniques described herein. Computing device 410 typically includes at least one processor 414 which communicates with a number of peripheral devices via bus subsystem 412. These peripheral devices may include a storage subsystem 424, including, for example, a memory subsystem 425 and a file storage subsystem 426, user interface output devices 420, user interface input devices 422, and a network interface subsystem 416. The input and output devices allow user interaction with computing device 410. Network interface subsystem 416 provides an interface to outside networks and is coupled to corresponding interface devices in other computing devices.

User interface input devices 422 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 410 to the user or to another machine or computing device.

Storage subsystem 424 stores programming and data constructs that provide the functionality of some or all of the modules described herein. For example, the storage subsystem 424 may include the logic to perform selected aspects of the methods of FIG. 3, as well as to implement various components depicted in FIGS. 1-2.

These software modules are generally executed by processor 414 alone or in combination with other processors. Memory 425 used in the storage subsystem 424 can include a number of memories including a main random-access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computing device 410 communicate with each other as intended. Although bus subsystem 412 is shown schematically as a single bus, alternative implementations of the bus subsystem may use multiple busses.

Computing device 410 can be of varying types including a workstation, server, computing cluster, blade server, server farm, or any other data processing system or computing device. Due to the ever-changing nature of computers and networks, the description of computing device 410 depicted in FIG. 4 is intended only as a specific example for purposes of illustrating some implementations. Many other configurations of computing device 410 are possible having more or fewer components than the computing device depicted in FIG. 4.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors and comprising:
    retrieving, from an alias server, a list of mappings between:
        registered aliases of a plurality of data sources made accessible by a plurality of distributed control nodes (DCNs) of a process automation facility, and
        connection strings usable to communicate with the plurality of DCNs and node identifiers (IDs) useable to exchange data with individual data sources made accessible by the plurality of DCNs;
    using the list of mappings, interrogating the plurality of DCNs to determine locally registered aliases from the plurality of DCNs;
    based on the locally registered aliases, generating an updated alias configuration file; and
    comparing the updated alias configuration file with a previously utilized alias configuration file.

2. The method of claim 1, wherein each of the DCNs hosts a server that provides access to a respective one or more of the plurality of data sources.

3. The method of claim 1, wherein the alias server comprises a global discovery server (GDS).

4. The method of claim 1, further comprising verifying, based on the comparing, whether the plurality of data sources made accessible by the plurality of DCNs corresponds to a conceptual plurality of data sources contained in the previously utilized alias configuration file.

5. The method of claim 4, further comprising:
    identifying one or more discrepancies between the plurality of data sources made accessible by the plurality of DCNs and the conceptual plurality of data sources contained in the previously utilized alias configuration file; and
    causing output to be rendered that conveys one or more of the identified discrepancies.

6. The method of claim 1, further comprising merging the updated alias configuration file with the previously utilized alias configuration file based on the comparing.

7. The method of claim 1, further comprising updating the previously utilized alias configuration file based on the comparing.

8. The method of claim 1, wherein at least some of the plurality of data sources comprise input/output (I/O) channels for sensors and/or actuators of the process automation facility.

9. The method of claim 1, further comprising, prior to the retrieving, registering the conceptual plurality of data sources contained in the previously utilized alias configuration file with the alias server, wherein the comparing verifies the registering.

10. The method of claim 1, wherein the retrieving includes retrieving a list of the registered aliases from the alias server.

11. The method of claim 10, wherein the method further comprises comparing the list of the registered aliases retrieved from the alias server to the locally registered aliases.

12. A system comprising one or more processors and memory storing instructions that, in response to execution by the one or more processors, cause the one or more processors to:
    obtain a list of mappings between:
        registered aliases of a plurality of data sources made accessible by a plurality of servers hosted across a distributed computing system of a process automation facility, and
        connection strings usable to communicate with the plurality of servers and node identifiers (IDs) useable to exchange data with individual data sources made accessible by the plurality of servers;
    using the list of mappings, cause the plurality of servers to be interrogated to determine locally registered aliases from the plurality of servers;
    based on the locally registered aliases, generate an updated alias configuration file; and
    reconcile the updated alias configuration file with a previously utilized alias configuration file.

13. The system of claim 12, wherein each of the servers is hosted by a respective distributed control node (DCN) that provides access to a respective one or more of the plurality of data sources.

14. The system of claim 12, wherein at least some of the plurality of data sources comprise input/output (I/O) channels for sensors and/or actuators of the process automation facility.

15. The system of claim 12, further comprising instructions to:
    verify whether the plurality of data sources made accessible by the plurality of servers corresponds to a conceptual plurality of data sources contained in the previously utilized alias configuration file; and
    identify one or more discrepancies between the plurality of data sources made accessible by the plurality of servers and the conceptual plurality of data sources contained in the previously utilized alias configuration file.

16. At least one non-transitory computer-readable medium comprising instructions that, when executed by one or more processors, cause the one or more processors to:
   retrieve, from an alias server, a list of mappings between:
      registered aliases of a plurality of data sources made accessible by a plurality of distributed control nodes (DCNs) of a process automation facility, and
      connection strings usable to communicate with the plurality of DCNs and node identifiers (IDs) useable to exchange data with individual data sources made accessible by the plurality of DCNs;
   using the list of mappings, interrogate the plurality of DCNs to determine locally registered aliases from the plurality of DCNs;
   based on the locally registered aliases, generate an updated alias configuration file; and
   reconcile the updated alias configuration file with a previously utilized alias configuration file.

17. The at least one non-transitory computer-readable medium of claim 16, wherein the instructions to retrieve include instructions to retrieve a list of the registered aliases from the alias server.

18. The at least one non-transitory computer-readable medium of claim 17, wherein the system further comprises instructions to compare the list of the registered aliases retrieved from the alias server to the locally registered aliases.

* * * * *